(12) United States Patent
Kim et al.

(10) Patent No.: US 9,009,129 B2
(45) Date of Patent: *Apr. 14, 2015

(54) PRESENTING SEARCH RESULTS ANNOTATED WITH DOMAIN ENDORSEMENTS

(75) Inventors: Lawrence H. Kim, San Jose, CA (US); Seungphil Oh, Pusan (KR); Satish Kumar Musukula, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

This patent is subject to a terminal disclaimer.

(21) Appl. No.: 13/341,518

(22) Filed: Dec. 30, 2011

(65) Prior Publication Data

US 2013/0097142 A1    Apr. 18, 2013

Related U.S. Application Data

(60) Provisional application No. 61/546,376, filed on Oct. 12, 2011.

(51) Int. Cl.
*G06F 17/30* (2006.01)
*G06Q 30/02* (2012.01)
*G06Q 50/00* (2012.01)

(52) U.S. Cl.
CPC .......... *G06Q 30/02* (2013.01); *G06F 17/30867* (2013.01); *G06Q 50/01* (2013.01)

(58) Field of Classification Search
USPC .......... 707/999.003–999.005, 706, 736, 722, 707/726, 728, 732
See application file for complete search history.

(56) References Cited

U.S. PATENT DOCUMENTS 6,560,590 B1 * 5/2003 Shwe et al. ............... 706/55
7,739,281 B2 * 6/2010 Najork ................... 707/735
7,788,260 B2  8/2010 Lunt et al.
(Continued)

FOREIGN PATENT DOCUMENTS

KR    1020110066039 A    6/2011

OTHER PUBLICATIONS

Tvarozek, et al., "Improving Semantic Search via Integrated Personalized Faceted and Visual Graph Navigation", In Proceedings of the 34th Conference on Current Trends in Theory and Practice of Computer Science 2008, pp. 778-789.

(Continued)

*Primary Examiner* — Hung T Vy
(74) *Attorney, Agent, or Firm* — Doug Barker; Dave Ream; Micky Minhas

(57) ABSTRACT

Systems, methods, and computer-readable storage media for presenting results of search queries with indications that at least a portion of such results has been endorsed by the user and/or social network connections of the user, are provided. Upon receipt of a search query, Web search results satisfying the query are determined. Satisfying search results that have been endorsed by the requesting user and/or one or more social network connections of the requesting user are identified. Upon presentation of the search results on the SERF, those results that were identified as having been endorsed by the requesting user and/or one or more social network connections of the requesting user are annotated as such. In this way, the requesting user may be able to more readily identify personally relevant results as the annotated results have been indicated to be preferences of the user and/or his or her social network connections.

20 Claims, 13 Drawing Sheets

(56) References Cited

U.S. PATENT DOCUMENTS

| | | | |
|---|---|---|---|
| 7,895,177 | B2 | 2/2011 | Wu |
| 7,991,764 | B2 | 8/2011 | Rathod |
| 8,171,009 | B2* | 5/2012 | Soroca .......................... 707/706 |
| 8,626,604 | B1* | 1/2014 | Gandhi ...................... 705/26.35 |
| 2004/0148201 | A1 | 7/2004 | Smith et al. |
| 2007/0067282 | A1* | 3/2007 | Prakash et al. ................... 707/5 |
| 2007/0203887 | A1* | 8/2007 | Dynin ............................... 707/3 |
| 2008/0005072 | A1 | 1/2008 | Meek et al. |
| 2008/0229244 | A1 | 9/2008 | Markus et al. |
| 2009/0106226 | A1 | 4/2009 | Ojakaar et al. |
| 2009/0144264 | A1 | 6/2009 | Singh et al. |
| 2009/0282002 | A1 | 11/2009 | Reeder et al. |
| 2009/0327287 | A1* | 12/2009 | Soroca ............... 707/5 |
| 2010/0094869 | A1 | 4/2010 | Ebanks |
| 2010/0312724 | A1 | 12/2010 | Pinckney et al. |
| 2010/0332330 | A1 | 12/2010 | Goel et al. |
| 2011/0040741 | A1 | 2/2011 | Korte et al. |
| 2011/0106746 | A1 | 5/2011 | Ventilla et al. |
| 2011/0178995 | A1 | 7/2011 | Suchter et al. |
| 2011/0191318 | A1 | 8/2011 | Gilbey et al. |
| 2011/0258042 | A1 | 10/2011 | Purvy et al. |
| 2012/0323704 | A1* | 12/2012 | Steelberg et al. .......... 705/14.73 |
| 2013/0097141 | A1* | 4/2013 | Kim et al. .................... 707/706 |
| 2013/0097143 | A1* | 4/2013 | Shenoy et al. ................ 707/706 |

OTHER PUBLICATIONS

Tippin, Chilton, "Does Google Use Facebook for Social Search Results?", Retrieved on: May 20, 2011, Available at: http://signalnews.com/google-facebook-social-search-results424.

"Facebook User Profiles for Search Engine Opens", Retrieved on: Sep. 27, 2011, Available at: http://amjadiqbal.com/facebook-user-profiles-for-search-engine-opens.htm.

Maurice, Selin, "Search Engine Results Pages & Social Media Integration", Retrieved on: Sep. 27, 2011, Available at: http://blog.milestoneinternet.com/web-2/search-engines-and-social-media/.

Wingfield, "Facebook, Microsoft Deepen Search Ties," retrieved Oct. 18, 2011, http://online.wsj.com/article/SB10001424052748703421204576327600877796140.html.

PCT International Search Report with Written Opinion dated Feb. 28, 2013 in PCT/US2012/060134 9 pages.

U.S. Non-Final Office Action in U.S. Appl. No. 13/341,301 dated Aug. 30, 2012 9 pages.

U.S. Final Office Action in U.S. Appl. No. 13/341,301 dated Aug. 9, 2013 10 pages.

U.S. Non-Final Office Action in U.S. Appl. No. 13/341,527 mailed Oct. 8, 2013 12 pages.

Non-Final Office Action dated Jan. 15, 2014 regarding U.S. Appl. No. 13/341,301 10 pages.

Final Office Action dated Jan. 27, 2014 regarding U.S. Appl. No. 13/341,527 16 pages.

* cited by examiner

DISCOVER BING: BING IS BEAUTIFUL! LEARN MORE BOUT HOW BING CAN...
OFFICIAL PRODUCT TOUR AND LINKS TO BING-RELATED PROMOTIONAL MATERIALS.
WWW.DISCOVERBING.COM – MARK AS SPAM
 MANISH MITTAL LIKES THIS

*FIG. 3.*

BMW OF NORTH AMERICA, LLC
THE OFFICIAL BMW OF NORTH AMERICA WEB SITE. LEARN ABOUT ALL BMW SERIES AND MODELS AND FIND OUT WHERE TO FIND THE CLOSEST BMW CENTER.
WWW.BMWUSA.COM – MARK AS SPAM
 YOU LIKE BMW USA

*FIG. 4.*

DREAMIT VENTURES ANNOUNCES ITS FIRST BATCH OF NYC STARTUPS

MAY 09, 2011 TECHCRUNCH TV THE CRUNCHIES; BETA INVITES; ELEVATOR PITCHES; GILLMOR GANG; PODCASTS; TECHCRUNCH EUROPE TECHCRUNCH TRENDS; TECHCRUNCH FRANCE TECHCRUNCH.COM

 AUSTIN HAUGEN LIKES TECHCRUNCH.COM

*FIG. 5.*

BLOG – KIM KARDASHIAN VIDEOS, PHOTOS AND BLOG: OFFICIAL WEBSITE

DON'T FORGET TO WATCH AN ALL NEW EPISODE OF KHLOE & LAMAR TONIGHT AT 10/9C ON E! IN THIS EPISODE. JAMIE MISSES AN IMPORTANT BUSINESS MEETING AND LAMAR HAS TO PUT.... KIMKARDASHIAN.CELEBUZZ.COM

 LAUREN KIM LIKES CELEBUZZ

*FIG. 6.*

PALO ALTO SUSHI
32 BUSINESSES REVIEWED FOR SUSHI IN PALO ALTO ON YELP. READ ABOUT PLACES LIKE: HOMMA'S BROWN RICE SUSHI, JIN SHO, FUKI SUSHI, SUSHI HOUSE, KANPAI SUSHI...
WWW.YELP.COM
▲ 👍 LAWRENCE KIM, 20 OTHER SOCIAL CONNECTIONS, AND 2,099 PEOPLE LIKE FUKI IN PALO ALTO, CA
SUJI BROWN, 3 OTHER SOCIAL CONNECTIONS, AND 340 PEOPLE LIKE JIN SHO IN PALO ALTO, CA
JOSHUA AND 302 PEOPLE LIKE MIYAKE RESTAURANT IN PALO ALTO, CA

*FIG. 7.*

$305   MARRIOTT'S MAUI OCEAN CLUB- LAHAINA AND...
SELECT   100 NOHEA KAI DR, LAHAINA, HI – 3.5
DEAL   ☆☆☆☆☆  ☐☐☐☐☐  DETAILS – TRIPADVISOR REVIEWS
FAVORITE  ☐
▲ 👍 JAMES CARTER AND 6 OTHER SOCIAL CONNECTIONS LIKE THIS HOTEL ON TRAVELOCITY
🖼 JANE S ALSO LIKES SHERATON MAUI RESORT & SPA IN IAHINA, HI

*FIG. 8.*

PRESENTING SEARCH RESULTS ANNOTATED WITH DOMAIN ENDORSEMENTS

CROSS-REFERENCE TO RELATED APPLICATIONS

This application claims priority to U.S. Provisional Patent Application No. 61/546,376 filed Oct. 12, 2011 and entitled "Presenting Search Results Annotated with Social Network Connection Information," which application is hereby incorporated by reference as if set forth in its entirety herein.

BACKGROUND

The Internet, through its billions of Web pages, provides a vast and quickly growing library of information and resources. In order to find desired content, computer users often make use of search utilities. Exemplary Internet search engines are well known in the art, for instance, a commonly known commercial engine is the BING search engine provided by Microsoft Corporation of Redmond, Wash. When a user performs a Web search utilizing a search engine, it can be challenging to choose among several similar-looking results, especially in a case of opinion-preference queries rather than factual ones. Similarly, in some cases, the search result that best meets the user's needs might be one that is not surfaced in the first page of search results and, accordingly, the user may not find it.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, presenting, in association with search engine results pages, results of search queries with indications that such results have been endorsed by the user and/or social network connections of the user. Upon receipt of a search query, Web search results satisfying the query are determined. Satisfying search results that have been endorsed by the requesting user and/or one or more social network connections of the requesting user are identified. Upon presentation of the search results on the search engine results page (SERP), those results that were identified as having been endorsed by the requesting user and/or one or more social network connections of the requesting user are annotated as such. In this way, the requesting user may be able to more readily identify results personally relevant to him or her as the annotated results have been indicated to be preferences of the user and/or his or her social network connections.

BRIEF DESCRIPTION OF THE DRAWINGS

The present invention is illustrated by way of example and not limitation in the accompanying figures in which like reference numerals indicate similar elements and in which:

FIG. 3 is a schematic diagram showing an exemplary screen display of a search result displayed in association with a search engine results page (SERP) having an annotation indicating that the referenced document has been endorsed by a social network connection of the user, in accordance with an embodiment of the present invention;

FIG. 4 is a schematic diagram showing an exemplary screen display of a search result displayed in association with a SERP having an annotation indicating that a web page associated with a social networking site, the web page being associated with or mapped to the particular Uniform Resource Locator (URL) that was identified as satisfying the input search query is endorsed by the requesting user, in accordance with an embodiment of the present invention;

FIG. 5 is a schematic diagram showing an exemplary screen display of a search result displayed in association with a SERP indicating that a social network connection of the user has endorsed the head domain of the URL that represents the document determined to satisfy the search request, in accordance with an embodiment of the present invention;

FIG. 6 is a schematic diagram showing an exemplary screen display of a search result displayed in association with a SERP, the search result having an annotation indicating that a web page associated with or mapped to a social networking site includes the head domain of the URL determined to satisfy the search result, such head domain being endorsed by the user and/or a social network connection of the user, in accordance with an embodiment of the present invention;

FIG. 7 is a schematic diagram showing an exemplary screen display of a search result displayed in association with SERP having annotations indicating that particular entities associated with a query result have been endorsed by an aggregation of social network application and/or search application users, in accordance with an embodiment of the present invention;

FIG. 8 is a schematic diagram showing an exemplary screen display of a search result displayed in association with SERP having annotations indicating that particular entities associated with a query result have been endorsed by an aggregation of social network application and/or search application users, and a related entity has been endorsed by a social network connection of the user, in accordance with an embodiment of the present invention;

DETAILED DESCRIPTION

Figure 1:
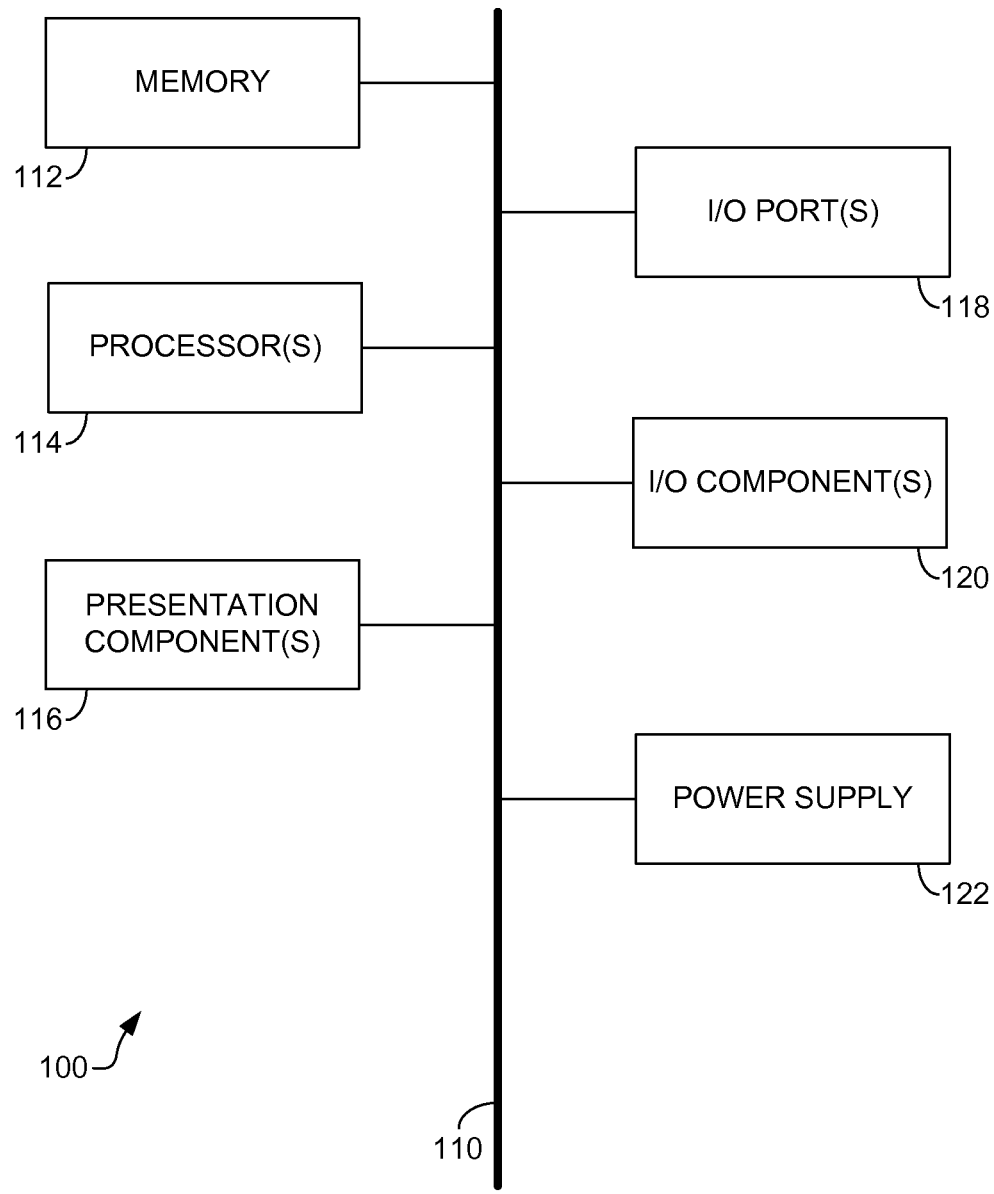
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, presenting, in association with search engine results pages, results of search queries with indications that such results have been endorsed by social network connections of the user. Endorsements may take a variety of forms including, without limitation, liking, sharing, tagging, commenting on, reading, viewing, selecting, bookmarking, saving, etc. Basically, an endorsement can be based upon any action taken by a user and/or a social network connection of the user with respect to a particular document. (It should be noted that "documents" is intended to encompass any identified search result whether in textual form, audio form, image form, video form, website link, or the like.) Upon receipt of a search query, Web search results satisfying the query are determined. Satisfying search results that have been endorsed by the requesting user and/or one or more social network connections of the requesting user are identified. Upon presentation of the search results on the search engine results page (SERP), those results that were identified as having been endorsed by the requesting user and/or one or more social network connections of the requesting user are annotated as such. In this way, the requesting user may be able to more readily identify results personally relevant to him or her as the annotated results have been indicated to be preferences of the user and/or his or her social network connections.

Accordingly, one embodiment of the present invention is directed to one or more computer-readable storage media storing computer-useable instructions that, when used by one or more computing devices, cause the one or more computing devices to perform a method for presenting, in association with search engine results pages, results of search queries with indications that such results have been endorsed by the user and/or the user's social network connections. The method includes receiving a search query from a user, identifying a plurality of documents that satisfy the received search query, determining that data associated with social network connections of the user is available, identifying at least one document of the plurality of documents that has been endorsed by the user and/or the one or more social network connections of the user, and presenting an identifier of the at least one document on a search engine results page with an indication that the at least one document has been endorsed by the user and/or the one or more of the social network connections of the user.

Another embodiment of the present invention is directed to a method being performed by one or more computing devices including at least one processor, for presenting, in association with search engine results pages, results of search queries with personalized endorsement indications. The method includes receiving a search query from a user, identifying a plurality of documents that satisfies the received search query, determining that data associated with social networking connections of the user is available, identifying at least one document of the plurality of documents that has been endorsed by the user and/or one or more of the social network connections of the user, and presenting an identifier of the at least one document on a search engine results page with a personalized endorsement indication indicating that the document has been endorsed by the user and/or the one or more of the social network connections of the user.

In yet another embodiment, the present invention is directed to one or more computer-readable storage media storing computer-useable instructions that, when used by one or more computing devices, cause the one or more computing device to perform a method for presenting, in association with search engine results pages, results of search queries with indications that at least a portion of such results are associated with web pages that have been endorsed by a user and/or social network connections of the user. The method includes receiving a search query from a user, identifying a plurality of documents that satisfies the received search query, determining that the user is authenticated with at least one social networking application associated with the social network connections of the user, identifying at least one document of the plurality of documents that is a associated with a webpage, the webpage having been endorsed by the user and/or one or more of the social network connections of the user, and presenting an identifier of the at least one document on a search engine results page with an indication that the webpage associated with the at least one document has been endorsed by the user and/or the one or more of the social network connections of the user.

In still another embodiment, the present invention is directed to one or more computer-readable storage media storing computer-useable instructions that, when used by one or more computing devices, cause the one or more computing devices to perform a method for presenting, in association with search engine results pages, results of search queries with indications that domains associated with at least a portion of such results have been endorsed by a user and/or social network connections of the user. The method includes receiving a search query from a user, identifying a plurality of documents that satisfies the received search query, determining that the user is authenticated with at least one social networking application associated with the social network connections of the user, identifying at least one document of the plurality of documents having a head domain that has been endorsed by the user and/or one or more of the social network connections of the user, and presenting an identifier of the at least one document on a search engine results page with an indication that the head domain associated with the document has been endorsed by the user and/or the one or more of the social network connections of the user.

In another embodiment, the present invention is directed to a method being performed by one or more computing devices including at least one processor, for presenting, in association with search engine results pages, results of search queries with personalized endorsement indications. The method includes receiving a search query from a user, identifying a plurality of documents that satisfies the received search query, determining that data associated with social networking connections of the user is available, identifying at least one document of the plurality of documents having a head domain that has been endorsed by the user and/or one or more of the social network connections of the user, and presenting an identifier of the at least one document on a search engine results page with a personalized endorsement indication indicating that the head domain associated with the document has been endorsed by the user and/or the one or more of the social network connections of the user.

In yet another embodiment, the present invention is directed to one or more computer-readable storage media storing computer-useable instructions that, when used by one or more computing devices, cause the one or more computing device to perform a method for presenting, in association with search engine results pages, results of search queries with indications that head domains associated with at least a portion of such results are associated with web pages that have been endorsed by a user and/or social network connections of the user. The method includes receiving a search query from a user, identifying a plurality of documents that satisfies the received search query, determining that the user is authenticated with at least one social networking application associated with the social network connections of the user, identifying at least one document of the plurality of documents that has a head domain that is associated with a social networking application webpage, the social networking application webpage having been endorsed by the user and/or one or more of the social network connections of the user, and presenting an identifier of the at least one document on a search engine results page with an indication that the head domain has been endorsed by the user and/or the one or more of the social network connections of the user.

Another embodiment of the present invention is directed to one or more computer-readable storage media storing computer-useable instructions that, when used by one or more computing devices, cause the one or more computing devices to perform a method for presenting, in association with search engine results pages, results of search queries with indications that at least a portion of such results has been aggregately endorsed by a plurality of users. The method includes receiving an endorsement for a document from a first user, determining that data associated with at least one of a social network application and a search application is available for the first user, identifying at least one preference entity associated with the first user from the available data, and associating the document endorsement with the preference entity, wherein the document endorsement is aggregated with endorsements of the document from at least one other user associated with the at least one preference entity.

In still another embodiment, the present invention is directed to a method being performed by one or more computing devices including at least one processor, for presenting, in association with search engine results pages, results of search queries with indications that at least a portion of such results has been aggregately endorsed by a plurality of users. The method includes receiving a search query from a user, identifying a plurality of documents that satisfies the received search query, identifying at least one document of the plurality of documents that has associated aggregated endorsement data, and presenting an identifier of the at least one document on a search engine results page with an indication that the at least one document has been endorsed by an aggregation of users.

In yet another embodiment, the present invention is directed to a system for presenting, in association with search engine results pages, results of search queries with indications that at least a portion of such results has been aggregately endorsed by a plurality of users. The system includes a computing device associated with a search engine having one or more processors and one or more computer-readable storage media, and a data store coupled with the search engine. The search engine is configured to receive an endorsement for a document from a first user, determine that data associated with at least one of a social network application and a search application is available for the first user, identify at least one preference entity associated with the first user from the available data, and associate the document endorsement with the preference entity, wherein the document endorsement is aggregated with endorsements of the document from at least one other user associated with the at least one preference entity.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously mentioned, embodiments of the present invention are generally directed to systems, methods, and computer-readable storage media for, among other things, presenting, in association with search engine results pages, results of search queries with indications that such results have been endorsed by the user and/or one or more social network connections of the user. Upon receipt of a search query, Web search results satisfying the query are determined. Satisfying search results that have been endorsed by the requesting user and/or one or more social network connections of the requesting user are identified. Upon presentation of the search results on the search engine results page (SERP), those results that were identified as having been endorsed by the requesting user and/or one or more social network connections of the requesting user are annotated as such. In this way, the requesting user may be able to more readily identify results personally relevant to him or her as the annotated results have been indicated to be preferences of the user and/or his or her social network connections.

Figure 2:
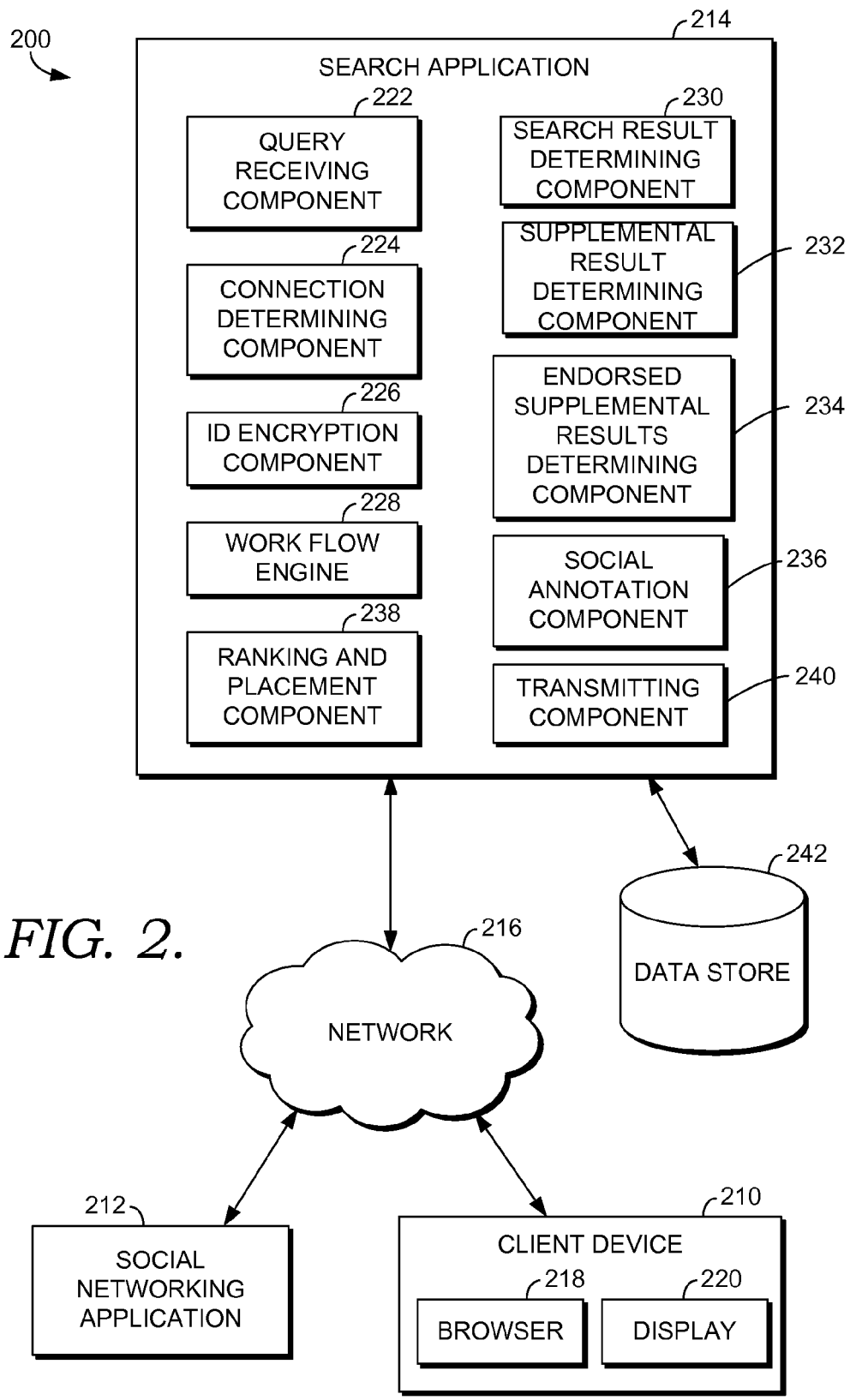
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which search results that have been endorsed by a user and/or social network connections of the user are presented with annotations indicating such in association with a search engine results page (SERP). Among other components not shown, the computing system 200 generally includes a client device 210, a social networking application 212, and a search application 214, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

It should be understood that any number of client computing devices, social networking applications, and search applications may be employed in the computing system 200 within the scope of embodiments of the present invention. Each may comprise a single device/interface or multiple devices/interfaces cooperating in a distributed environment. For instance, the search application 214 may comprise multiple devices and/or modules arranged in a distributed environment that collectively provide the functionality of the search application 214 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the client device 210, as an Internet-based service, or as a module inside the social networking application 212 and/or the search application 214. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of social networking applications, search applications, or client computing devices. By way of example only, the search application 214 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client computing device 210 may include any type of computing device, such as the computing device 100 described with reference to FIG. 1, for example. Generally, the client computing device 210 includes a browser 218 and a display 220. The browser 218, among other things, is configured to render search engine home pages (or other online landing pages), and render SERPs in association with the display 220 of the client computing device 210. The browser 218 is further configured to receive user input of requests for various web pages (including search engine home pages), receive user inputted search queries (generally inputted via a user interface presented on the display 220 and permitting alpha-numeric and/or textual input into a designated search box) and to receive content for presentation on the display 220, for instance, from the search application 214. It should be noted that the functionality described herein as being performed by the browser 218 may be performed by any other application capable of rendering Web content. Any and all such variations, and any combination thereof, are contemplated to be within the scope of embodiments of the present invention.

The social networking application 212 is configured to facilitate electronic social networking between its users. In this regard, the social networking application is configured to receive input of identifying information about a user and maintain such information, for instance, in a data store (not shown) associated with the social networking application 212. Identifying information may include, but is not limited to, a user profile page (the name of which is generally the name of the user to whom it pertains), one or more networks of the user, a location of the user, interests of the user, and the identity of other users with whom the user has established connections. The identifying information about the user may be input directly by the user (e.g., name, location, interests, etc.) or may be derived from information input or otherwise provided by the user. For instance, if a user inputs that s/he attended College A or that s/he works at Company B, networks associated with College A and/or company B may be associated with the user. Exemplary social networking applications are well known in the art, for instance, a commonly known social networking application is FACEBOOK, INC. of Palo Alto, Calif.

The social networking application 212 is configured to permit its users to establish social network connections with other application users. In this way, a user may be connected to another user by a first degree connection (e.g., a "friend") meaning that the two users are directly connected with one another. Or, a user may not be directly connected with another user but have a second degree connection (e.g, a "friend of a friend") or more remote connection with that user through his/her first degree connections.

The social networking application 212 is further configured to permit its users to take particular actions with respect to documents in a social networking context and accordingly endorse such documents, that is, express a user-affinity for such documents. For instance, endorsements may include, without limitation, liking (i.e., indicating a preference or liking for the document/page), sharing, tagging, commenting on, reading, viewing, selecting, bookmarking, saving, etc. Basically, an endorsement can be based upon any action taken by a user and/or a social connection of the user with respect to a particular document. Information indicating that a particular social networking application user has endorsed a particular document is stored in association with that user's social networking data.

The search application 214 is configured to receive and respond to requests that it receives from components associated with client computing devices, for instance, the browser 218 associated with the client computing device 210. Those skilled in the art of the present invention will recognize that the present invention may be implemented with any number of searching utilities. For example, an Internet search engine or a database search engine may utilize the present invention. These search engines are well known in the art, and commercially available engines share many similar processes not further described herein.

As illustrated, the search application 214 includes a query receiving component 222, a connection determining component 224, an identification (ID) encryption component 226, a work flow engine 228, a search results determining 230, a supplemental result determining component 232, an endorsed supplemental result determining component 234, a social annotation component 236, a ranking and placement component 238 and a transmitting component 240. The illustrated search application 214 also has access to a data store 242. The data store 242 is configured to store information pertaining to user social networking identifiers and connections of users. In various embodiments, such information may include, without limitation, a name of its users' profile pages, an identity of networks of its users, a location of its users, information about its users' social network connections (first degree connections and those that are more distant or remote), and information indicating that particular documents or Web pages have been endorsed by social networking users. In embodiments, the data store 242 is configured to be searchable for one or more of the items stored in association therewith. It will be understood and appreciated by those of ordinary skill in the art that the information stored in association with the data store 242 may be configurable and may include any information relevant to social networking identifiers, social network connections of a plurality of users, and identifiers of documents endorsed by the plurality of users. The content and volume of such information are not intended to limit the scope of embodiments of the present invention in any way. Further, though illustrated as a single, independent component, the data store 242 may, in fact, be a plurality of storage devices, for instance a database cluster, portions of which may reside in association with the search application 214, the social networking application 212, the client computing device 210, another external computing device (not shown), and/or any combination thereof.

In embodiments, each endorsement instance of a Web document is stored in association with the data store 242 as its own document. Therefore, if one million social networking application users endorsed a particular URL, the endorsement data is represented by one million separated documents in an index (not shown) associated with the data store 242. In addition, for each endorsed document in the index, a list of social network connections of the social networking application users that endorsed the document may also be stored. By associating all the social network connections with each endorsed document, the search application 214 can query for all documents endorsed by a user and/or a user's social network connections with a single social networking identification. However, this results in much duplicated data in the index (both in redundant document information and redundant social network connection information).

In other embodiments, the list of social network connections associated with each instance of an endorsement associated with a document may not be stored. In addition, each indexed document is represented by a given Uniform Resource Locator (URL), and users that endorse that given URL may be indexed as a meta-word of the document. Thus, when the search application 214 queries for all documents endorsed by a user and/or a user's social network connections, retrieved is a list of all social network connections at query-time and sent to the index (not shown) as a large OR query. In order for this to be done efficiently, the index may be partitioned by the users that endorsed the document identified by the given URL. At times this may result in popular documents duplicated across the index cluster but the maximum number of copies is bounded by the number of indexing units in the cluster.

The query receiving component 222 of the search application 214 is configured to receive requests for presentation of SERPs having results that satisfy an input search query (e.g., matches identified via keyword matching). Typically, such a request is received via a browser associated with a client computing device, for instance, the browser 218 associated with the client computing device 210. In embodiments, received requests for presentation of SERPs having satisfying search results are also requests for presentation of supplemental or additional search results (outside of algorithmically-derived Web search results) satisfying the search query, as more fully described below.

The connection determining component 224 is configured to determine whether a user from whom a search query is received is authenticated with at least one social networking application associated with social network connections of the user. That is, the connection determining component 224 is configured to determine whether social networking information about a user from whom a search query is received is available. In embodiments, such determination is made by determining whether or not the requesting user is engaged in an active session with the social networking application 212. A user may be engaged in an active session with the social networking application 212 by having a browser window actively logged into the social networking application. A user may also be engaged in an active session with the social networking application 212 even without having an active window if s/he has opted in a previous active session with the social networking application to stay logged into the service even upon closure of the browser session. In another embodiment, the user may login to the social networking application 212 from the search application 214 using a social networking identifier associated with the user. Any and all such variations, and any combination thereof, are contemplated to be within the scope of embodiments of the present invention. However the user establishes an active session with the social networking application 212, being engaged in such active session permits the search application to access information about the user's social network connections.

By way of example only, the exemplary social networking application FACEBOOK, INC. of Palo Alto, Calif. employs an "instant personalization" functionality that enables users of FACEBOOK, INC. to log onto third party websites (e.g., the search application 214) with their FACEBOOK identity and access their FACEBOOK identity information from the context of the third party website.

The connection determining component 224 is further configured to receive the user's social networking identification (ID) from the social networking application 212. The identification encryption component 226 is configured to encrypt the received social networking ID of the user to facilitate security of the users of the social networking application 212 and the search application 214.

The work flow engine 228 is configured to facilitate identification and collection of information to be presented on the SERF in response to an input query. That is, the work flow engine 228 is configured to coordinate interactions between the various other components of the search application (e.g., the search result determining component 230, the supplemental result determining component 232, the endorsed supplemental result determining component 234, and the social annotation component 236). Various ones of the search application components are dependent upon output of other components. It is the job of the work flow engine 228 to coordinate information acquisition in the most efficient and timely manner possible.

The search result determining component 230 is configured to identify search results that satisfy the input search query. In this regard, the input to the search result determining component 230 is the search query received (e.g., by the query receiving component 222) and the output is a ranked listing of documents determined to satisfy the query. Algorithms utilized for identifying and ranking results are known to those of ordinary skill in the art and, accordingly, are not further described herein.

The supplemental result determining component 232 is configured to identify one or more documents to be presented to the user in response to a query as a supplemental or additional search result. Supplemental search results are small snippets of information related to the keywords in a received query that are determined to be the most likely answer to the input query. Such supplemental results generally are determined independently of the standard algorithmically-derived Web search results and are thus results that are additional or supplementary to the algorithmically-derived Web search results satisfying the search query. In embodiments, such additional or supplemental results are presented in a specified area of the SERP that is differentiated from the algorithmically-derived Web search results. In other embodiments, such additional or supplemental results are integrated and presented in association with the standard search results. Exemplary additional or supplemental results may include weather information, news information, sports information, and the like. In accordance with embodiments of the present invention, information pertaining to social network connections of the user may be presented on the SERP as supplemental or additional search results.

The endorsed supplemental result determining component 234 is a particular supplemental results determining component that is configured to identify documents that are not only most likely to represent an answer to an input query but also ensure that identified documents have been endorsed by the user and/or one or more social network connections of the user. In this regard, the input into the endorsed supplemental result determining component 234 is the social networking ID (or encrypted social networking ID, as appropriate) and the output from the endorsed supplemental result determining component 234 is information pertaining to one or more Web documents (e.g., Uniform Resource Locators associated with identified Web documents) that not only satisfy the input search query but that have also been endorsed by the requesting user and/or at least one social network connections of the requesting user.

Once Web documents that satisfy the query have been determined (e.g., by the search result determining component 230), the information about the satisfying documents is passed back to the work flow engine 228. The work flow engine 228 then passes the document identification information from the search result determining component 230 and the social networking ID of the user to the social annotation component 236. The social annotation component 236 is configured to communicate with the data store 242 to identify information about the social network connection(s) of the requesting user that have endorsed the identified documents. In this regard, the social annotation component 236 is configured to query the data store 242 for a facepile or other package of information that is stored in association with the data store 242 that contains information associated with the social network connection(s) of the user that have endorsed the identified documents. The facepile (or other package of information) then may be utilized to render annotations regarding those documents that have been endorsed by the user and/or one or more social network connections of the user indicating the identity of those social network connections of the user that did the endorsing. In this regard, the facepile may include, without limitation, a user profile page (the name of which is generally the name of the social networking application user to whom it pertains), one or more networks of the user, a location of the user, and a thumbnail image associated with the user.

The user and/or social network connections of the user may be determined to have endorsed a document in a number of different ways. In the simplest instantiation, a user or social network connection of a user is determined to have endorsed a document identified by a particular URL only if the user or social network connection of the user has endorsed the exact URL associated with the document. Thus, if a social network connection of the user has endorsed the URL "cnn.com/article.12345" and that exact URL is determined to satisfy the input search query, the search result will be annotated with an indication that the particular social network connection of the user endorsed the particular URL (e.g., the annotation may read "social network connection X has endorsed this"). This type of social networking annotation may be referred to as a Type I annotation and is illustrated and more fully described with reference to FIG. 3.

FIG. 3 is a schematic diagram showing an exemplary screen display 300 of a search result displayed in association with a SERP having an annotation indicating that the referenced document has been endorsed by a social network connection of the user, in accordance with an embodiment of the present invention. In the illustrated example, the requesting user's social network connection, by the name of "Manish Mittal," has endorsed (expressed an affinity for) the exact URL identified as satisfying the input search query, www.discoverbing.com.

In other embodiments, the exact URL may not be endorsed by the user and/or a social network connection of the user but instead a webpage associated with the social networking application, the webpage being associated with or mapped to the URL, may be endorsed by the user. For instance, social networks often contain fan pages associated with particular persons or topics of interest. By way of example, the social networking application 212 may include a fan page for Lady Gaga. The fan page may then be associated with a particular webpage, for instance, ladygaga.com. Upon ladygaga.com being identified by the search application 214 as a satisfying search result, a social networking annotation may be presented in association with the URL, even though the user and/or a social network connection may not have endorsed the exact URL but instead the fan page. In this instance, the social networking annotation may read "social network connection X has endorsed Lady Gaga." This type of social networking annotation may be referred to as a Type II annotation and is illustrated and more fully described with reference to FIG. 4.

FIG. 4 is a schematic diagram showing an exemplary screen display 400 of a search result displayed in association with a SERP having an annotation indicating that a web page associated with a social networking site, the web page being associated with or mapped to the particular URL that was identified as satisfying the input search query is endorsed by the requesting user, in accordance with an embodiment of the present invention. In the illustrated example, the user has endorsed (expressed an affinity for) a webpage (for instance, a fan page entitled "BMW USA") associated with a social networking site that is mapped to or otherwise associated with the identified URL, www.bmwusa.com. Note that the user has not expressed an affinity for the exact URL itself.

In other embodiments, a user and/or a social network connection of a user may have endorsed or indicated a preference for a head domain associated with a URL determined to satisfy a search request. For instance, a user (e.g., social network connection X) may endorse the head domain "yahoo.com." Subsequently, in response to a search query, the URL "yahoo.com/article12345" may be determined to satisfy the request. Because the head domain of the URL determined to satisfy the search query is an exact match to the endorsed head domain, a social networking annotation may be presented indicating that "social network connection X has endorsed yahoo.com." Note that the user (e.g., social network connection X) need not have endorsed the exact URL satisfying the request (e.g., "yahoo.com/article12345") but rather the head domain of the URL. This type of social networking annotation may be referred to as a Type III annotation and is illustrated and more fully described with reference to FIG. 5.

FIG. 5 is a schematic diagram showing an exemplary screen display 500 of a search result displayed in association with a SERP indicating that a social network connection of the user has endorsed the head domain of the URL that represents the document determined to satisfy the search request, in accordance with an embodiment of the present invention. In the illustrated example, a social network connection of the user by the name of "Austin Haugen" has endorsed (expressed an affinity for) the head domain "techcrunch.com." Upon "www.techcrunch.com/2011/05/09/dreamit-ventures" being surfaced as a URL determined to satisfy an input search query, the social networking annotation "Austin Haugen likes Techcrunch.com" is presented.

In still other embodiments, the exact URL determined to satisfy an input search query may not be endorsed by the user and/or a social network connection of the user but instead a webpage associated with the social networking application, the webpage being associated with or mapped to the head domain associated with the satisfying URL, may be endorsed. For instance, social networks often contain fan pages associated with particular persons or topics of interest. By way of example, the social networking application 212 may include a fan page devoted to Lady Gaga. The fan page may then be associated with or mapped to a particular webpage having the head domain "celebuzz.com," e.g., "ladygaga.celebuzz.com/blog." Upon a search result including the head domain "celebuzz.com" being identified by the search application 214 as a satisfying search result (for instance, "kimkardashian.celebuzz.com/XYZ"), a social networking annotation may be presented in association with the URL, even though the user and/or a social network connection of the user may not have endorsed the exact URL but instead a fan page associated with the head domain of the URL. In this instance, the social networking annotation may read "social network connection X has endorsed celebuzz.com." This type of social networking annotation may be referred to as a Type IV annotation and is illustrated and more fully described with reference to FIG. 6.

FIG. 6 is a schematic diagram showing an exemplary screen display 600 of a search result displayed in association with a SERP, the search result having an annotation indicating that a web page associated with or mapped to a social networking site includes the head domain of the URL determined to satisfy the search result, such head domain being endorsed by the user and/or a social network connection of the user, in accordance with an embodiment of the present invention. In the illustrated example, a social network connection of the user by the name of "Lauren Kim" has endorsed (expressed an affinity for) a social networking site fan page that is mapped to the head domain of a URL determined to satisfy an input search query. That is, Lauren Kim has endorsed a social networking site fan page mapped to the head domain "celebuzz.com" such that when the URL "kimkardashian.celebuzz.com/blog" is surfaced as a satisfying search result to an input search query, the social networking annotation "Lauren Kim likes Celebuzz" is presented.

In other embodiments of the present invention, endorsement data may be aggregated among users of a social networking application and/or a search application. In this way, endorsement data associated with users that align with the requesting user in a dimension other than by being a social network connection of the requesting user may be presented in association with search results. For instance, users that align with the requesting user may include those disclosing similar interests and/or preferences as the requesting user to the search application and/or the social networking application, for instance, via their respective application user profiles. This type of pooling or aggregating of endorsement data among a larger corpus of application users will likely result in more endorsement data than that produced only by the user and his or her social network connections which, in turn, likely will aid in increasing the number of search queries input by a requesting user that are associated with endorsement data relevant to the user.

To pool or aggregate endorsement data, interests and/or preference information associated with eligible users of a search application and/or social networking application are utilized. Eligible users may include all users of the search and/or social networking application that have not specifically expressed an interest in having their endorsement information withheld from aggregation. The interests and/or preference information of eligible users may be derived, for instance, from the respective profiles of the users associated with the search and/or social networking application, the profiles including information such as, without limitation, their fan page endorsements, location, employer, school, groups, networks, and the like. It will be understood and appreciated by those of ordinary skill in the art that any information associated with a preference and/or interest of a user may be utilized within the scope of embodiments hereof.

For each eligible user, a large dimensional sparse profile-vector is created based on their respective social networking application and search application preference and interest data. The profile-vector contains an element or identifier for each possible preference and/or interest entity, e.g., for each fan page endorsement, location, employer, school, group, network, etc., of the eligible user. For example, an eligible user (User A) may endorse the "cricket fan page" and may live or be employed in "Mountain View, Calif." In this instance, unique identifiers for the entities "cricket fan page" and "Mountain View, Calif." may be created as profile-vector elements for User A. Logically, the bit locations for the locations of these identifiers or elements on the profile-vector are switched on.

When User A endorses (expressing an affinity for) a particular URL (document), the URL receives a vote or endorsement on each of the profile-vector elements associated with User A. Thus, if User A endorses "cnn.com," the URL "cnn.com" receives a vote or endorsement from each of the "cricket fan page" and "Mountain View, Calif." profile-vector elements. For each new user that endorses the URL "cnn.com," votes are added to URL associated with the profile-vector elements of the endorsing user.

It should be noted that votes or endorsements may be normalized, for instance, to address social network application fan pages that have a lot of users. One approach for normalization is to create a reference voted URL which gets a vote whenever any URL gets a vote and then normalize the votes by taking the ratio of the URL with the reference URL.

The more dominant elements of the profile-vector endorsements associated with each URL are kept after normalization and processing all endorsement data for a pre-determined time period (e.g., one week). In embodiments, the dominant elements may be identified based upon a threshold.

To apply the aggregating endorsement functionality described herein to social networking annotations of algorithmically-derived Web search results, the described computation may be applied only with respect to the top N endorsed URLs in the search logs. Such treatment likely will cover a vast majority of all head queries and most popular URLs even for tail queries. For each of the URLs, the dominant profile-vector elements may be stored as values in a data store (e.g., data store 242 of FIG. 2). This will be a new table keyed of the URL hash (URL dominant-profile table) in the data store. The search phase is then identical to standard algorithmically-derived Web search (e.g., conducted by the Web answer component 230 of FIG. 2).

In the annotation phase, the URL and the user that submitted a given search request are matched on the profile information (stored as Ids). The user profile information is obtained from the already existing fan page endorsement and profile stores. The URL dominant profile table is used to find the dominant URL profile. Once there is a match, the URL is annotated with a text, e.g., "People who endorsed the cricket fan page endorsed this" or "People in Mountain View, Calif. endorsed this," and presented in association with the accompanying Web search result. In embodiments, this approach can be used to re-rank the Web search results as well.

FIGS. 7 and 8 illustrate endorsement aggregation annotations. FIG. 7 is a schematic diagram showing an exemplary screen display 700 illustrating a search result displayed in association with SERP having annotations indicating that particular entities associated with a query result have been endorsed by an aggregation of social network application and/or search application users, in accordance with an embodiment of the present invention. FIG. 8 is a schematic diagram showing an exemplary screen display 800 illustrating a search result displayed in association with SERP having annotations indicating that particular entities associated with a query result have been endorsed by an aggregation of social network application and/or search application users, and a related entity has been endorsed by a social network connection of the user, in accordance with an embodiment of the present invention.

Aggregating endorsement annotations allows users to receive the benefit of endorsements of the whole of a social networking application and/or search application and not just their own connections. In fact, the IDs of the entities in the profile of the user are effectively utilized as "virtual connections" of the user. To get more annotations in relation to Web search results (and/or supplemental or additional search results), this functionality encourages users to endorse more fan pages associated with a social networking application which discloses more of their personal preferences. This behavior (vs. social-connection-only based annotation) is a faster way to grow coverage.

If a user does not like a specific result, the user can un-endorse the fan page on the social network or remove the piece of his or her associated profile. This removes the annotation or result automatically and in real-time. Similarly, a user can join a fan page and instantly see annotated results from the fan page. This also improves the accuracy of the user's data. The user also has the ability to join more groups in a social networking application to get more recommended results.

With reference back to FIG. 2, the ranking and placement component 238 is a service that includes page layout architecture and ranking algorithms. As such, the ranking and placement component 238 is configured to determine whether an identified document is relevant enough to be shown in association with the SERP and the relative placement of such document. The ranking and placement component 238 may also contain association logic for the satisfying document URLs and the annotations (facepiles) for rendering. In terms of determining which type of social annotation to show in association with a given search result when multiple types exist, in embodiments, the lower the type number, the higher the rank. For instance, Type I annotations will trump Type II annotations which will trump Type III annotations which will trump Type IV annotations.

The transmitting component 240 is configured to transmit the Web search results for presentation as on a SERP (e.g., on the display 220 associated with the client computing device 210) and to present annotations indicating that identified documents have been endorsed by the user and/or social network connections of the user. Presentation of such annotations is discussed more fully herein with reference to the screen displays of FIGS. 3-8.

Figure 9:
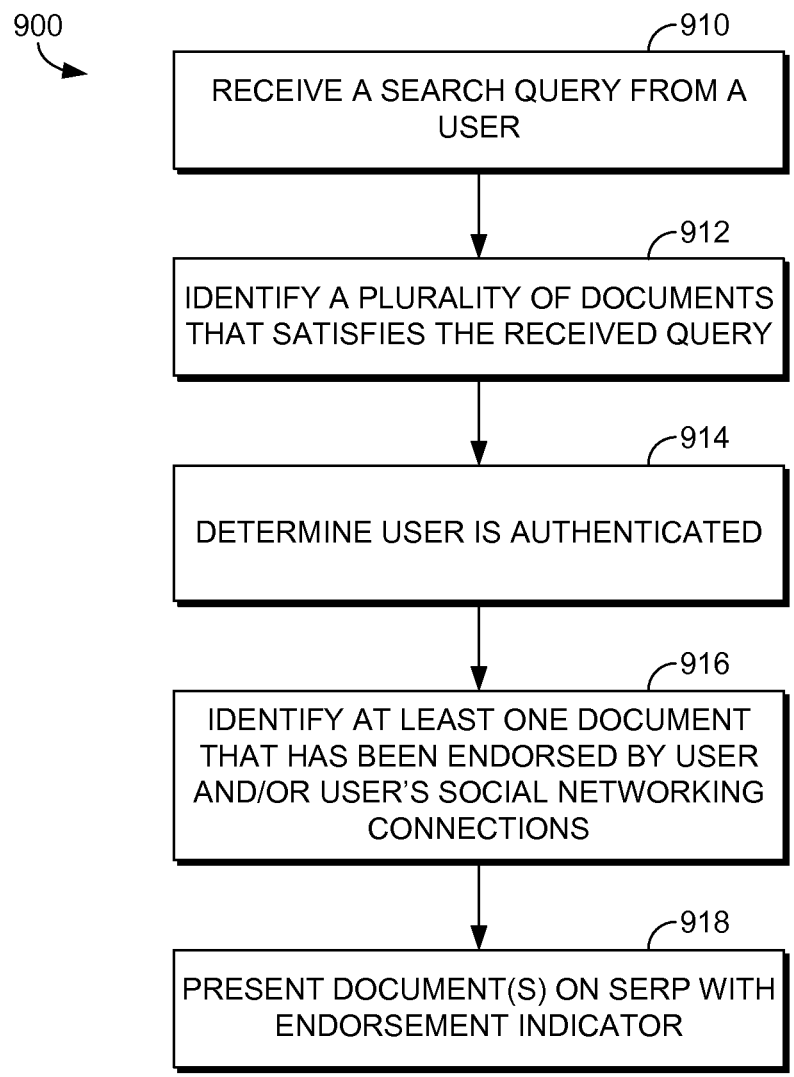
FIG. 9 is a flow diagram illustrating an exemplary method for presenting, in association with search engine results pages, results of search queries with indications that at least a portion of such results have been endorsed by a requesting user and/or social network connections of a requesting user, in accordance with an embodiment of the present invention.

Turning now to FIG. 9, a flow diagram is shown illustrating an exemplary method 900 for presenting, in association with search engine results pages, results of search queries with indications that at least a portion of such results have been endorsed by a requesting user and/or social network connections of a requesting user, in accordance with an embodiment of the present invention. Initially, as indicated at block 910, a search query is received from a user, e.g., via search query input field of a user interface associated with a search application. As indicated at block 912, a plurality of documents that satisfies the received search query is identified. Algorithms for determining Web search results satisfying search queries are known to those of ordinary skill in the art and, accordingly, are not further discussed herein.

As indicated at block 914, it is determined that the user is authenticated with at least on social networking application associated with the social network connections of the user. In embodiments, such determination is made by determining that data associated with one or more social network connections of the user is available. In accordance with embodiments hereof, such data is determined to be available if the user is connected to a social networking application. As indicated at block 916, at least one document of the plurality of documents that was determined to satisfy the input search query is identified as having been endorsed by the user and/or one or more social network connections of the user. Upon presentation of the satisfying search results in association with the SERP, the document or documents identified as having been endorsed by the user and/or one or more social network connections of the user is annotated as such, as indicated at block 918. In this way, the user may more readily identify those search results that he or she may find most relevant personally, as the user and/or social network connections of the user have indicated a preference for the document(s).

Figure 10:
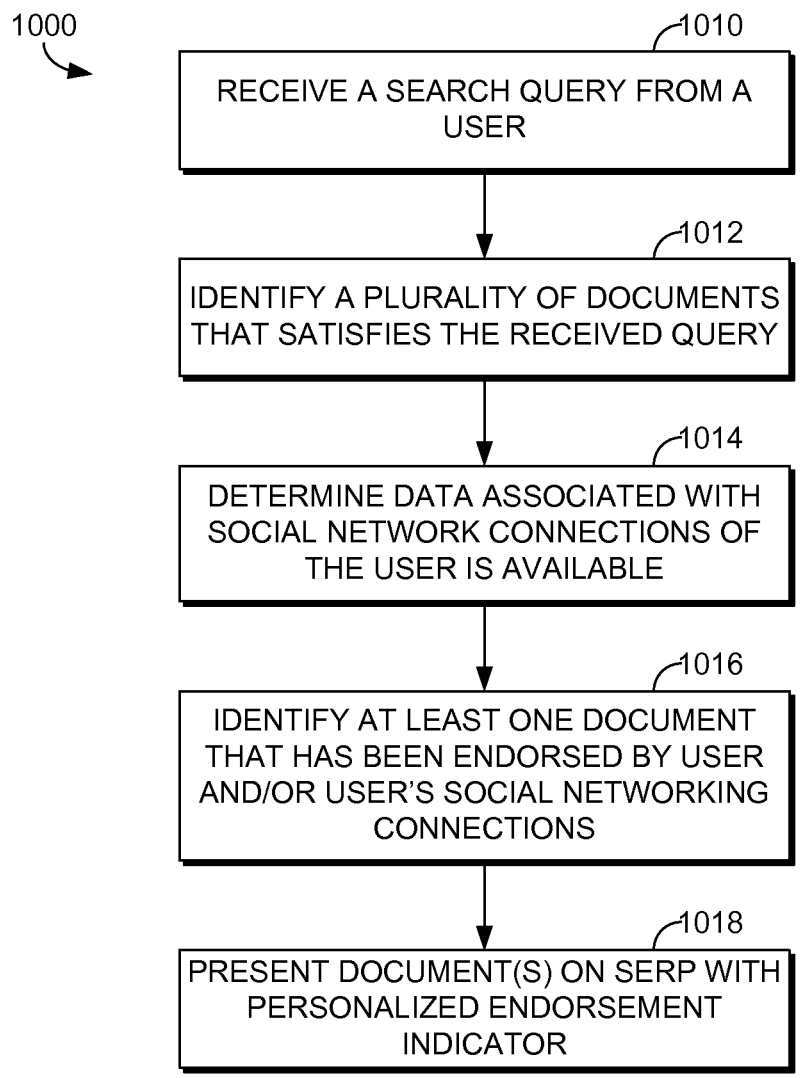
FIG. 10 is a flow diagram illustrating an exemplary method for presenting, in association with search engine results pages, results of search queries with personalized endorsement indications, in accordance with an embodiment of the present invention.

With reference to FIG. 10, a flow diagram is shown illustrating an exemplary method 1000 for presenting, in association with search engine results pages, results of search queries with personalized endorsement indications, in accordance with an embodiment of the present invention. Initially, as indicated at block 1010, a search query is received from a user, e.g., via search query input field of a user interface associated with a search application. As indicated at block 1012, a plurality of documents that satisfies the received search query is identified. Algorithms for determining Web search results satisfying search queries are known to those of ordinary skill in the art and, accordingly, are not further discussed herein.

As indicated at block 1014, it is determined that data associated with social network connections of the user is available. In accordance with embodiments hereof, such data is determined to be available if the user is connected to a social networking application. As indicated at block 1016, at least one document of the plurality of documents that was determined to satisfy the input search query is identified as having been endorsed by the user and/or one or more of the social network connections of the user. Upon presentation of the satisfying search results in association with the SERP, the document or documents identified as having been endorsed by the user and/or one or more social network connections of the user is annotated with a personalized endorsement indicator, as indicated at block 1018. In this way, the user may more readily identify those search results that he or she may find most relevant personally, as the user and/or social network connections of the user have indicated a preference for the document(s).

Figure 11:
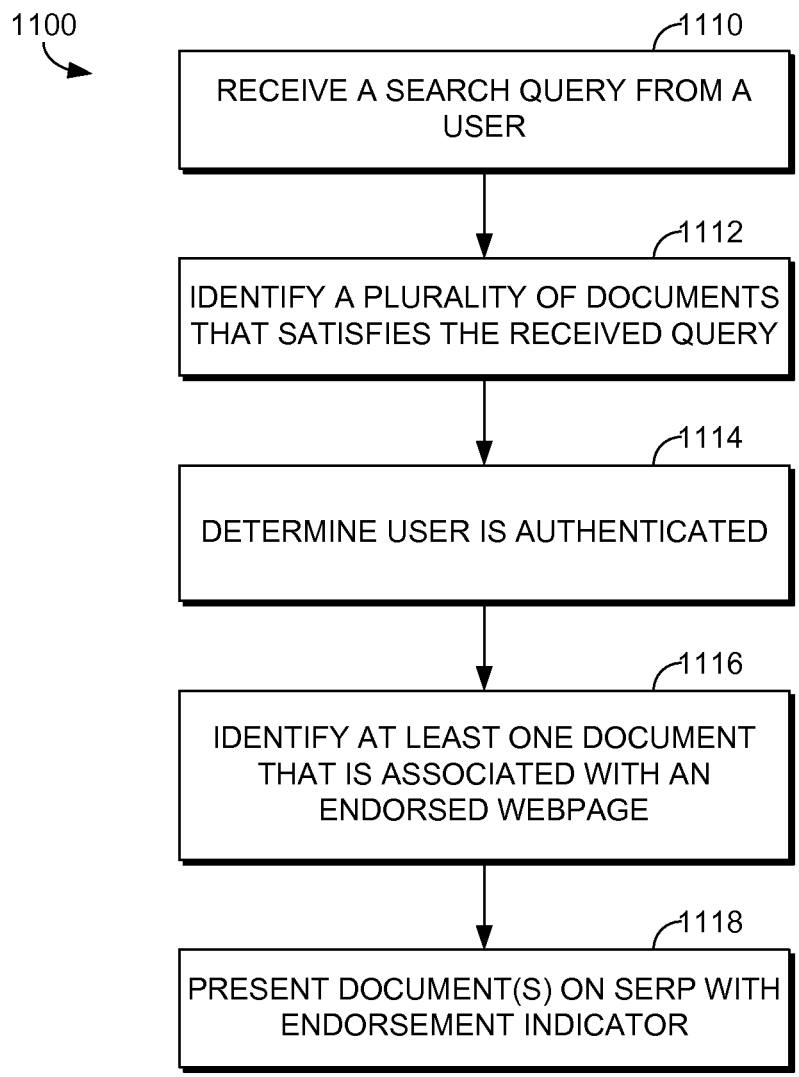
FIG. 11 is a flow diagram illustrating an exemplary method for presenting, in association with search engine results pages, results of search queries with indications that at least a portion of such results are associated with web pages that have been endorsed by a requesting user and/or social network connections of a requesting user, in accordance with an embodiment of the present invention.

Turning now to FIG. 11, a flow diagram is shown illustrating an exemplary method 1100 for presenting, in association with search engine results pages, results of search queries with indications that at least a portion of such results are associated with web pages that have been endorsed by a requesting user and/or social network connections of a requesting user, in accordance with an embodiment of the present invention. Initially, as indicated at block 1110, a search query is received from a user, e.g., via search query input field of a user interface associated with a search application. As indicated at block 1112, a plurality of documents that satisfies the received search query is identified. Algorithms for determining Web search results satisfying search queries are known to those of ordinary skill in the art and, accordingly, are not further discussed herein.

As indicated at block 1114, it is determined that the user is authenticated with at least on social networking application associated with the social network connections of the user. In embodiments, such determination is made by determining that data associated with one or more social network connections of the user is available. In accordance with embodiments hereof, such data is determined to be available if the user is connected to a social networking application. As indicated at block 1116, at least one document of the plurality of documents that was determined to satisfy the input search query is identified as being associated with a web page, the webpage having been endorsed by the user and/or one or more social network connections of the user. Upon presentation of the satisfying search results in association with the SERF, the document or documents identified are annotated with an indication that the web page associated with the document has been endorsed by the user and/or the one or more social network connections of the user, as indicated at block 1118. In this way, the user may more readily identify those search results that he or she may find most relevant personally, as the user and/or social network connections of the user have indicated a preference for a web page associated with the document(s).

Figure 12:
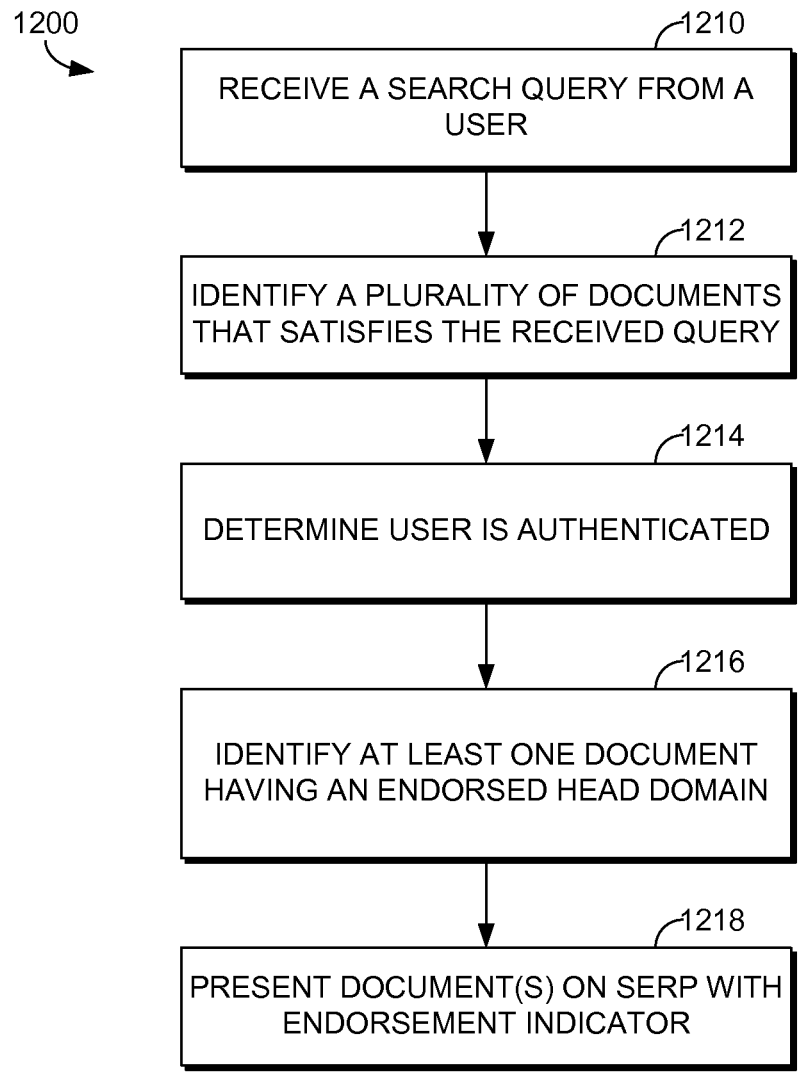
FIG. 12 is a flow diagram illustrating an exemplary method for presenting, in association with search engine results pages, results of search queries with indications that domains associated with at least a portion of such results have been endorsed by a requesting user and/or social network connections of a requesting user, in accordance with an embodiment of the present invention.

Turning now to FIG. 12, a flow diagram is shown illustrating an exemplary method 1200 for presenting, in association with search engine results pages, results of search queries with indications that domains associated with at least a portion of such results have been endorsed by a requesting user and/or social network connections of a requesting user, in accordance with an embodiment of the present invention. Initially, as indicated at block 1210, a search query is received from a user, e.g., via search query input field of a user interface associated with a search application. As indicated at block 1212, a plurality of documents that satisfies the received search query is identified. Algorithms for determining Web search results satisfying search queries are known to those of ordinary skill in the art and, accordingly, are not further discussed herein.

As indicated at block 1214, it is determined that the user is authenticated with at least on social networking application associated with the social network connections of the user. In embodiments, such determination is made by determining that data associated with one or more social network connections of the user is available. In accordance with embodiments hereof, such data is determined to be available if the user is connected to a social networking application. As indicated at block 1216, at least one document of the plurality of documents is identified as having a head domain that has been endorsed by the user and/or one or more social network connections of the user. Upon presentation of the satisfying search results in association with the SERP, the document or documents identified as having a head domain that has been endorsed by the user and/or one or more social network connections of the user is annotated as such, as indicated at block 1218. In this way, the user may more readily identify those search results that he or she may find most relevant personally, as the user and/or social network connections of the user have indicated a preference for the head domain associated with document(s).

Figure 13:
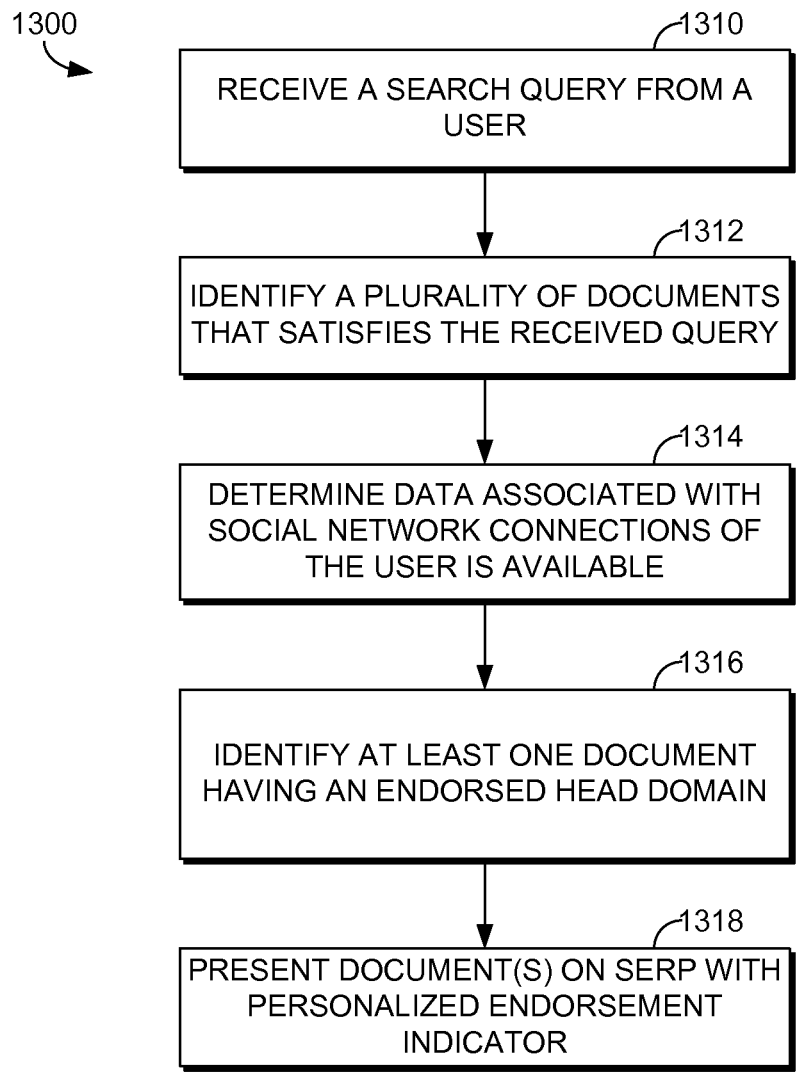
FIG. 13 is a flow diagram illustrating an exemplary method for presenting, in association with search engine results pages, results of search queries with personalized endorsement indications, in accordance with an embodiment of the present invention.

With reference to FIG. 13, a flow diagram is shown illustrating an exemplary method 1300 for presenting, in association with search engine results pages, results of search queries with personalized endorsement indications, in accordance with an embodiment of the present invention. Initially, as indicated at block 1310, a search query is received from a user, e.g., via search query input field of a user interface associated with a search application. As indicated at block 1312, a plurality of documents that satisfies the received search query is identified. Algorithms for determining Web search results satisfying search queries are known to those of ordinary skill in the art and, accordingly, are not further discussed herein.

As indicated at block 1314, it is determined that data associated with one or more social network connections of the user is available. In accordance with embodiments hereof, such data is determined to be available if the user is connected to a social networking application. As indicated at block 1316, at least one document of the plurality of documents is identified as having a head domain that has been endorsed by the user and/or one or more social network connections of the user. Upon presentation of the satisfying search results in association with the SERP, the document or documents identified as having head domain that has been endorsed by the user and/or one or more social network connections of the user is annotated with a personalized endorsement indicator, as indicated at block 1318. In this way, the user may more readily identify those search results that he or she may find most relevant personally, as the user and/or social network connections of the user have indicated a preference for the head domain of the document(s).

Figure 14:
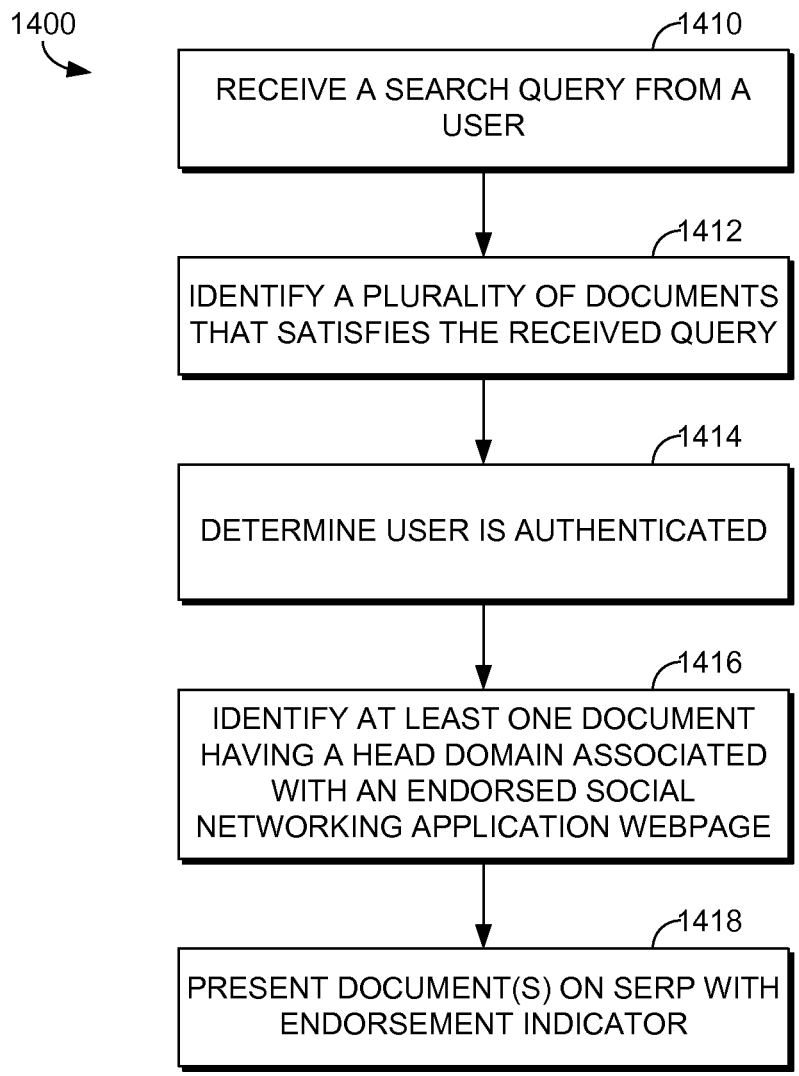
FIG. 14 is a flow diagram illustrating an exemplary method for presenting, in association with search engine results pages, results of search queries with indicators that head domains associated with at least a portion of such results are associated with web pages that have been endorsed by a user and/or social network connections of the user, in accordance with an embodiment of the present invention.

Turning now to FIG. 14, a flow diagram is shown illustrating an exemplary method 1400 for presenting, in association with search engine results pages, results of search queries with indicators that head domains associated with at least a portion of such results are associated with web pages that have been endorsed by a user and/or social network connections of the user, in accordance with an embodiment of the present invention. Initially, as indicated at block 1410, a search query is received from a user, e.g., via search query input field of a user interface associated with a search application. As indicated at block 1412, a plurality of documents that satisfies the received search query is identified. Algorithms for determining Web search results satisfying search queries are known to those of ordinary skill in the art and, accordingly, are not further discussed herein.

As indicated at block 1414, it is determined that the user is authenticated with at least on social networking application associated with the social network connections of the user. In embodiments, such determination is made by determining that data associated with one or more social network connections of the user is available. In accordance with embodiments hereof, such data is determined to be available if the user is connected to a social networking application. As indicated at block 1416, at least one document of the plurality of documents that was determined to satisfy the input search query is identified as having a head domain that is associated with a social networking application web page that has been endorsed by the user and/or one or more social network connections of the user. Upon presentation of the satisfying search results in association with the SERP, the document or documents identified as having a head domain that is associated with a social networking application web page that has been endorsed by the user and/or one or more social network connections of the user is annotated as such, as indicated at block 1418. In this way, the user may more readily identify those search results that he or she may find most relevant personally, as the user and/or social network connections of the user have indicated a preference for the head domain that is associated with a social networking application web page associated with the document(s).

Figure 15:
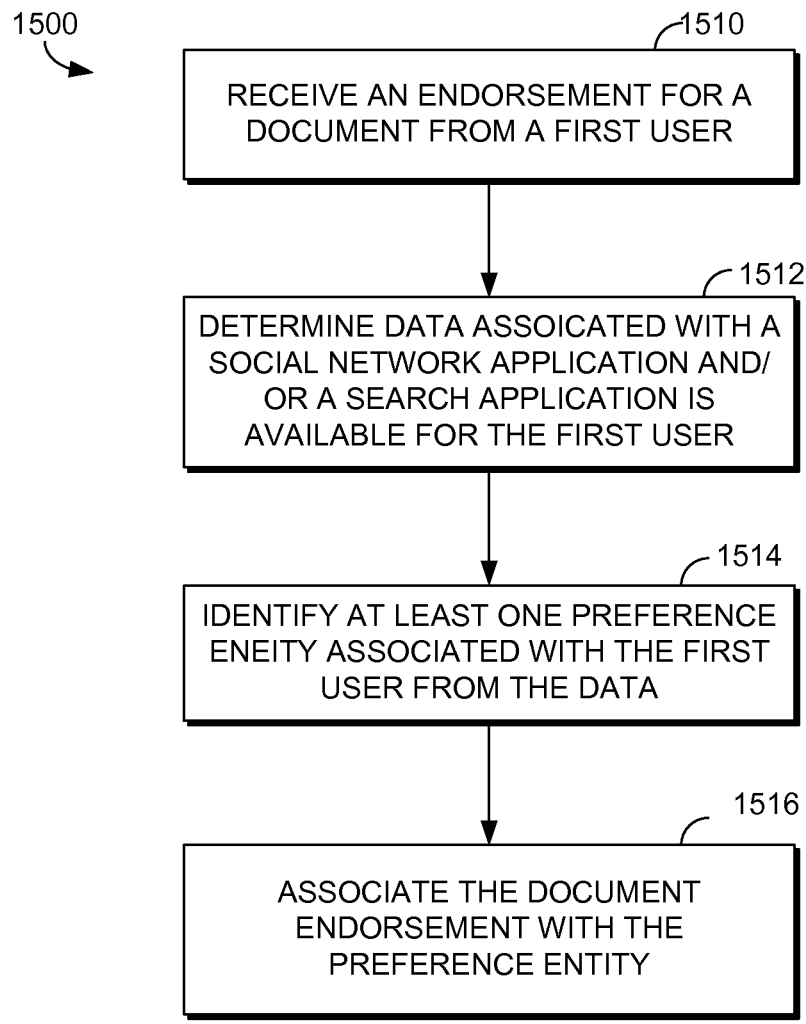
FIG. 15 is a flow diagram illustrating an exemplary method for presenting, in association with search engine results pages, results of search queries with indications that at least a portion of such results have been aggregately endorsed by a plurality of users, in accordance with an embodiment of the present invention.

With reference to FIG. 15, a flow diagram is shown illustrating an exemplary method 1500 for presenting, in association with search engine results pages, results of search queries with indications that at least a portion of such results have been aggregately endorsed by a plurality of users, in accordance with an embodiment of the present invention. Initially, as indicated at block 1510, an endorsement for a document is received from a first user. It is then determined that data associated with at least one of a social network application and a search application is available for the first user, as indicated at block 1512. At least one preference entity associated with the first user is then identified from the available data, as indicated at block 1514. The document endorsement is then associated with the preference entity, as indicated at block 1516. The document endorsement is aggregated with endorsements of the document from at least one other user associated with the at least one preference entity.

Figure 16:
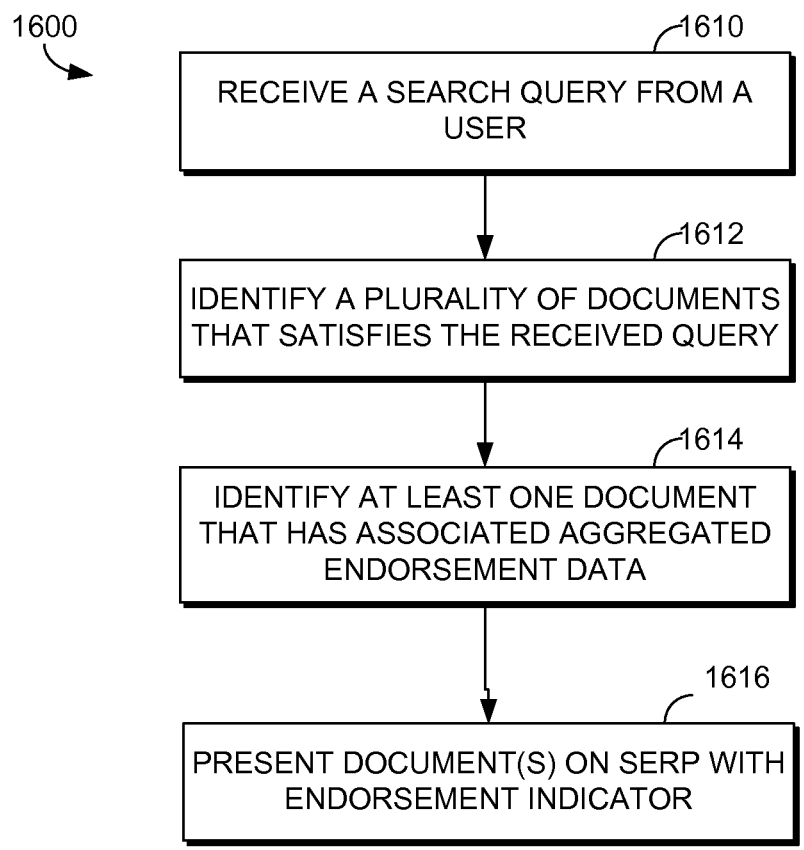
FIG. 16 is a flow diagram illustrating an exemplary method for presenting, in association with search engine results pages, results of search queries with indications that at least a portion of such results has been aggregately endorsed by a plurality of users, in accordance with an embodiment of the present invention.

Turning now to FIG. 16, a flow diagram is shown illustrating an exemplary method 1600 for presenting, in association with search engine results pages, results of search queries with indications that at least a portion of such results has been aggregately endorsed by a plurality of users, in accordance with an embodiment of the present invention. Initially, as indicated at block 1610, a search query is received from a user, e.g., via search query input field of a user interface associated with a search application. As indicated at block 1612, a plurality of documents that satisfies the received search query is identified. Algorithms for determining Web search results satisfying search queries are known to those of ordinary skill in the art and, accordingly, are not further discussed herein.

As indicated at block 1614, at least one document of the plurality of documents that was determined to satisfy the input search query is identified as being associated with aggregated endorsement data. Upon presentation of the satisfying search results in association with the SERF, the document or documents identified as being associated with aggregated endorsement data is annotated as such, as indicated at block 1616. In this way, the user may more readily identify those search results that he or she may find most relevant, as a plurality of users of the same social network and/or search application as the user have indicated a preference for the document(s).

As can be understood, embodiments of the present invention provide systems and methods for presenting endorsement indications in association with search engine results pages. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 900, 1000, 1100, 1200, 1300, 1400, 1500, and 1600 of FIGS. 9, 10, 11, 12, 13, 14, 15, and 16, respectively, is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. A system for presenting, in association with search engine results pages, results of search queries with indications that domains associated with at least a portion of such results have been endorsed by a user and/or social network connections of the user, the system comprising:
    one or more processors;
    one or more computer storage media storing computer-useable instructions that, when used by the one or more processors, cause the one or more processors to:
        receive a search query from the user;
        identify a plurality of documents that satisfies the received search query;
        determine that the user is authenticated with at least one social networking application associated with the social network connections of the user;
        identify at least one document of the plurality of documents having a document uniform resource locator (URL) that is associated with a head domain, wherein the document URL is different from the head domain, and wherein the document URL has not been endorsed by the user and/or one or more of the social network connections of the user;
        determine the head domain associated with the document URL has been endorsed by the user and/or the one or more of the social network connections of the user; and
        present the document URL of the at least one document on a search engine results page with an indication that the head domain associated with the document URL has been endorsed by the user and/or the one or more of the social network connections of the user.

2. The system of claim 1, wherein the one or more processors are further caused to present an identifier of the user and/or the one or more of the social network connections of the user that endorsed the head domain associated with the at least one document.

3. The system of claim 1, wherein identifying the plurality of documents that satisfies the received search query comprises identifying a plurality of algorithmically-derived Web documents that satisfies the received search query.

4. The system of claim 1, wherein determining that the user is authenticated with the at least one social networking application associated with the social network connections of the user comprises determining that data associated with the social network connections of the user is available.

5. The system of claim 4, wherein determining that the data associated with the social network connections of the user is available comprises determining that the user is engaged in an active session with the at least one social networking application.

6. The system of claim 5, wherein the data associated with the social network connections of the user is retrieved from a data store associated with the at least one social networking application.

7. The system of claim 1, wherein receiving the search query from the user comprises receiving the search query via a user interface associated with a search application, and wherein the data associated with the social network connections of the user is retrieved from a data store associated with the search application.

8. The system of claim 1, wherein at least a portion of the social network connections of the user comprises first degree social network connections.

9. A method being performed by one or more computing devices including at least one processor, for presenting, in association with search engine results pages, results of search queries with personalized endorsement indications, the method comprising:
    receiving a search query from a user;
    identifying a plurality of documents that satisfies the received search query;
    determining that data associated with social network connections of the user is available;
    identifying at least one document of the plurality of documents having a head domain that has been endorsed by the user and/or one or more of the social network connections of the user, wherein the at least one document has not been endorsed by the user and/or the one or more of the social network connections of the user; and presenting an identifier of the at least one document on a search engine results page with a personalized endorsement indication indicating that the head domain associated with the at least one document has been endorsed by the user and/or the one or more of the social network connections of the user.

10. The method of claim 9, further comprising presenting an identifier of the user and/or the one or more of the social network connections of the user that endorsed the head domain associated with the at least one document.

11. The method of claim 9, wherein identifying the plurality of documents that satisfies the received search query comprises identifying a plurality of algorithmically-derived Web documents that satisfies the received search query.

12. The method of claim 9, wherein determining that the data associated with the social network connections of the user is available comprises determining that the user is engaged in an active session with a social networking application associated with the data.

13. The method of claim 12, wherein the data associated with the social network connections of the user is retrieved from a data store associated with the social networking application.

14. The method of claim 9, wherein receiving the search query from the user comprises receiving the search query via a user interface associated with a search application, and wherein the data associated with the social network connections of the user is retrieved from a data store associated with the search application.

15. The method of claim 9, wherein at least a portion of the social network connections of the user comprises first degree social network connections.

16. One or more computer storage media storing computer-useable instructions that, when used by one or more computing devices, cause the one or more computing devices to perform a method for presenting, in association with search engine results pages, results of search queries with indications that head domains associated with at least a portion of such results are associated with webpages that have been endorsed by a user and/or social network connections of the user, the method comprising:

receiving a search query from the user;
identifying a plurality of documents that satisfies the received search query;
determining that the user is authenticated with at least one social networking application associated with the social network connections of the user;
identifying at least one document of the plurality of documents that has a head domain that is associated with a social networking application webpage, wherein the social networking application webpage has been endorsed by the user and/or one or more of the social network connections of the user, and wherein the at least one document has not been endorsed by the user and/or the one or more of the social network connections of the user; and
presenting an identifier of the at least one document on a search engine results page with an indication that the head domain has been endorsed by the user and/or the one or more of the social network connections of the user.

17. The one or more computer storage media of claim 16, wherein the method further comprises presenting an identifier of the user and/or the one or more of the social network connections of the user that endorsed the head domain associated with the at least one document.

18. The one or more computer storage media of claim 16, wherein determining that the user is authenticated with the at least one social networking application associated with the social network connections of the user comprises determining that data associated with the social network connections of the user is available.

19. The one or more computer storage media of claim 18, wherein the data associated with the social network connections of the user is retrieved from a data store associated with the at least one social networking application.

20. The one or more computer storage media of claim 18, wherein receiving the search query from the user comprises receiving the search query via a user interface associated with a search application, and wherein the data associated with the social network connections of the user is retrieved from a data store associated with the search application.

* * * * *